US011366815B2

(12) United States Patent
Le Merrer et al.

(10) Patent No.: US 11,366,815 B2
(45) Date of Patent: Jun. 21, 2022

(54) METHOD AND SELECTION OF A RECOMMENDATION ALGORITHM AND CORRESPONDING APPARATUS

(71) Applicant: InterDigital CE Patent Holdings, SAS, Paris (FR)

(72) Inventors: Erwan Le Merrer, Rennes (FR); Georgios Damaskinos, Lausanne (CH); Christoph Neumann, Cesson-Sevigne (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/963,911

(22) PCT Filed: Jan. 31, 2019

(86) PCT No.: PCT/EP2019/052345
§ 371 (c)(1),
(2) Date: Jul. 22, 2020

(87) PCT Pub. No.: WO2019/149804
PCT Pub. Date: Aug. 8, 2019

(65) Prior Publication Data
US 2021/0042317 A1 Feb. 11, 2021

(30) Foreign Application Priority Data
Jan. 31, 2018 (EP) .................................. 18305090

(51) Int. Cl.
*G06F 16/2457* (2019.01)

(52) U.S. Cl.
CPC .............................. *G06F 16/24575* (2019.01)

(58) Field of Classification Search
CPC .... G06F 16/00; G06F 16/24; G06F 16/24575; G06F 16/3322; G06F 16/9535; H04N 21/252; H04N 21/4532; H04N 21/466
See application file for complete search history.

(56) References Cited

U.S. PATENT DOCUMENTS

| 5,740,326 A | 4/1998 | Boulet et al. |
| 2008/0222140 A1* | 9/2008 | Lagad ................... G06F 16/951 |

(Continued)

FOREIGN PATENT DOCUMENTS

| CN | 102663128 A | 9/2012 |
| CN | 102663128 B | 11/2014 |

(Continued)

*Primary Examiner* — Irete F Ehichioya
*Assistant Examiner* — Xiaoqin Hu
(74) *Attorney, Agent, or Firm* — Volpe Koenig

(57) ABSTRACT

A query-set is used to obtain recommendation results from different recommendation algorithms available locally on a device. The same query-set is used to obtain recommendation results from a remote, well-established online recommendation system using an unknown recommendation algorithm. Distances are measured between the recommendation results from the online recommendation system and the recommendation results from each of the local recommendation algorithms. The local recommendation algorithm having generated recommendation results with a smallest distance to the recommendation results from the online recommendation system is selected for generation of recommendations based on a local recommendation algorithm.

13 Claims, 4 Drawing Sheets

(56) References Cited

U.S. PATENT DOCUMENTS

| | | | |
|---|---|---|---|
| 2011/0055004 A1* | 3/2011 | Libby | G06Q 30/0256 |
| | | | 705/14.45 |
| 2011/0179017 A1 | 7/2011 | Meyers et al. | |
| 2012/0278127 A1 | 11/2012 | Kirakosyan et al. | |
| 2014/0181100 A1 | 6/2014 | Ramer et al. | |
| 2015/0120722 A1* | 4/2015 | Mart n Mart nez | ......................... |
| | | | G06F 16/9535 |
| | | | 707/733 |
| 2016/0162974 A1 | 6/2016 | Lee et al. | |
| 2016/0379122 A1* | 12/2016 | Cheng | G06N 5/022 |
| | | | 706/46 |

FOREIGN PATENT DOCUMENTS

| | | |
|---|---|---|
| CN | 104090893 B | 11/2015 |
| CN | 105956631 A | 9/2016 |
| CN | 106202331 A | 12/2016 |
| KR | 20160069486 A | 6/2016 |

* cited by examiner

METHOD AND SELECTION OF A RECOMMENDATION ALGORITHM AND CORRESPONDING APPARATUS

This application claims the benefit, under 35 U.S.C. §371 of International Application PCT/EP2019/052345, filed Jan. 31, 2019, which was published in accordance with PCT Article 21(2) on Aug. 8, 2019, in English, and which claims the benefit of European Patent Application No. 18305090.5, filed Jan. 31, 2018.

FIELD

The present disclosure generally relates to the field of recommendation (recommender) systems, and in particularly to selection of recommendation (recommender) algorithms (methods).

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Systems that enable to predict a user preference or rating are commonly referred to as recommendation systems. Nowadays, recommendation systems have become part of every-day life and are increasingly used within the context of Internet searches on mobile devices. For consumers, the technology enables quick and efficient searches of items of interest while for service providers there are increased possibilities to generate additional revenue. An abundance of recommendation algorithms exists, and the choice of algorithm depends on many factors. A service provider will select a recommendation algorithm from a set of candidate algorithms that performs well to provide a high-quality service to its clients. Additionally, the selection may include parametrizing ('tuning') of the candidate algorithms to get optimal performance. The selection of a well-performing recommendation algorithm is a challenging task for the service provider. Recommendation algorithms may perform poorly when data is scarce, i.e. when recommending items for clients that are relatively 'new' to the recommendation system, or when the service provider starts a new service. A candidate algorithm, chosen initially for its good performance on scarce data, may eventually perform worse than other, not selected algorithms when more data becomes available. While traditionally recommendation systems are mostly cloud-based (on-line recommendation systems), the improved performance of user devices enables recommendation systems to run on these user devices. For users, advantages of such 'on-device' recommendation systems can be found in improved privacy because client data is no longer stored in the cloud, better personalization because the recommendation system targets the one user of the device, and increased autonomy, as for the recommendation system to function, the device does not require to communicate with a cloud server of the service provider. For service providers, advantages of on-device recommendation systems are in maintenance and exploitation costs as no cloud server farm is required for the recommendation system to operate. However, unlike on-line recommendation systems, the on-device recommendation system must do with relatively small data sets, especially so when a user is 'new' to the system. As mentioned previously, a good performance of a recommendation algorithm on scarce data may not preclude a non-competitive performance on richer data, as compared to other candidate algorithms. It is therefore desirable to provide a method and device for improved selection of a recommendation algorithm for on-device recommendations.

SUMMARY

According to one aspect of the present disclosure, there is provided a method of selection of a recommendation algorithm for a local recommender in a device. The method includes querying a plurality of local recommendation algorithms local to the device with a query-set and obtain a plurality of local recommendation results; querying a remote recommendation system with the query-set to obtain a remote recommendation system result; comparing the plurality of local recommendation results with the remote recommendation result; and selecting, from the plurality of local recommendation algorithms, a recommendation algorithm as a function of said comparing.

According to a further aspect of the method of selection of a recommendation algorithm, the selected local recommendation algorithm among the plurality of local recommendation algorithms is a recommendation algorithm from which a recommendation result is obtained with a smallest distance to the remote recommendation result.

According to a further aspect of the method of selection of a recommendation algorithm, the plurality of local recommendation algorithms comprise at least two differently parametrized versions of a same algorithm.

According to a further aspect of the method of selection of a recommendation algorithm, the method is implemented by one of a mobile communication device, a gateway, a set top box.

According to a further aspect of the method of selection of a recommendation algorithm, a recommendation is based on the selected local recommendation algorithm in an off-line mode of the device and a recommendation is obtained from the remote recommendation algorithm or another remote recommendation algorithm in an on-line mode of the device.

According to a further aspect of the method of selection of a recommendation algorithm, the on-line mode corresponds to conditions allowing communication between the device and a remote server running the remote recommendation algorithm or the another remote recommendation algorithm.

According to a further aspect of the method of selection of a recommendation algorithm, a recommendation is obtained from said selected recommendation algorithm or from said remote recommendation algorithm or another remote recommendation algorithm based on user choice.

The present principles also relate to a device for selection of a recommendation algorithm for a local recommender in the device. The device includes a processor configured to query a plurality of local recommendation algorithms local to the device with a query-set and to obtain a plurality of local recommendation results; to query a remote recommendation system with the query-set to obtain a remote recommendation system result; to compare the plurality of local recommendation results with the remote recommendation system result; and to select, from the plurality of local recommendation algorithms, a recommendation algorithm as a function of the remote recommendation result.

According to a further aspect of the device, the processor is further configured to select the local recommendation algorithm among said plurality of local recommendation algorithms from which a recommendation result is obtained with a smallest distance to said remote recommendation result.

According to a further aspect of the device, the device is one of a gateway, a Set Top Box, a mobile communication device.

BRIEF DESCRIPTION OF THE DRAWINGS

More advantages of the present disclosure will appear through the description of particular, non-restricting embodiments. To describe the way the advantages of the present disclosure can be obtained, particular descriptions of the present principles are rendered by reference to specific embodiments thereof which are illustrated in the appended drawings. The drawings depict exemplary embodiments of the disclosure and are therefore not to be considered as limiting its scope. The embodiments described can be combined to form particular advantageous embodiments. In the following figures, items with same reference numbers as items already described in a previous figure will not be described again to avoid unnecessary obscuring the disclosure. The embodiments will be described with reference to the following drawings in which.

It should be understood that the drawings are for purposes of illustrating the concepts of the disclosure and are not necessarily the only possible configuration for illustrating the disclosure.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
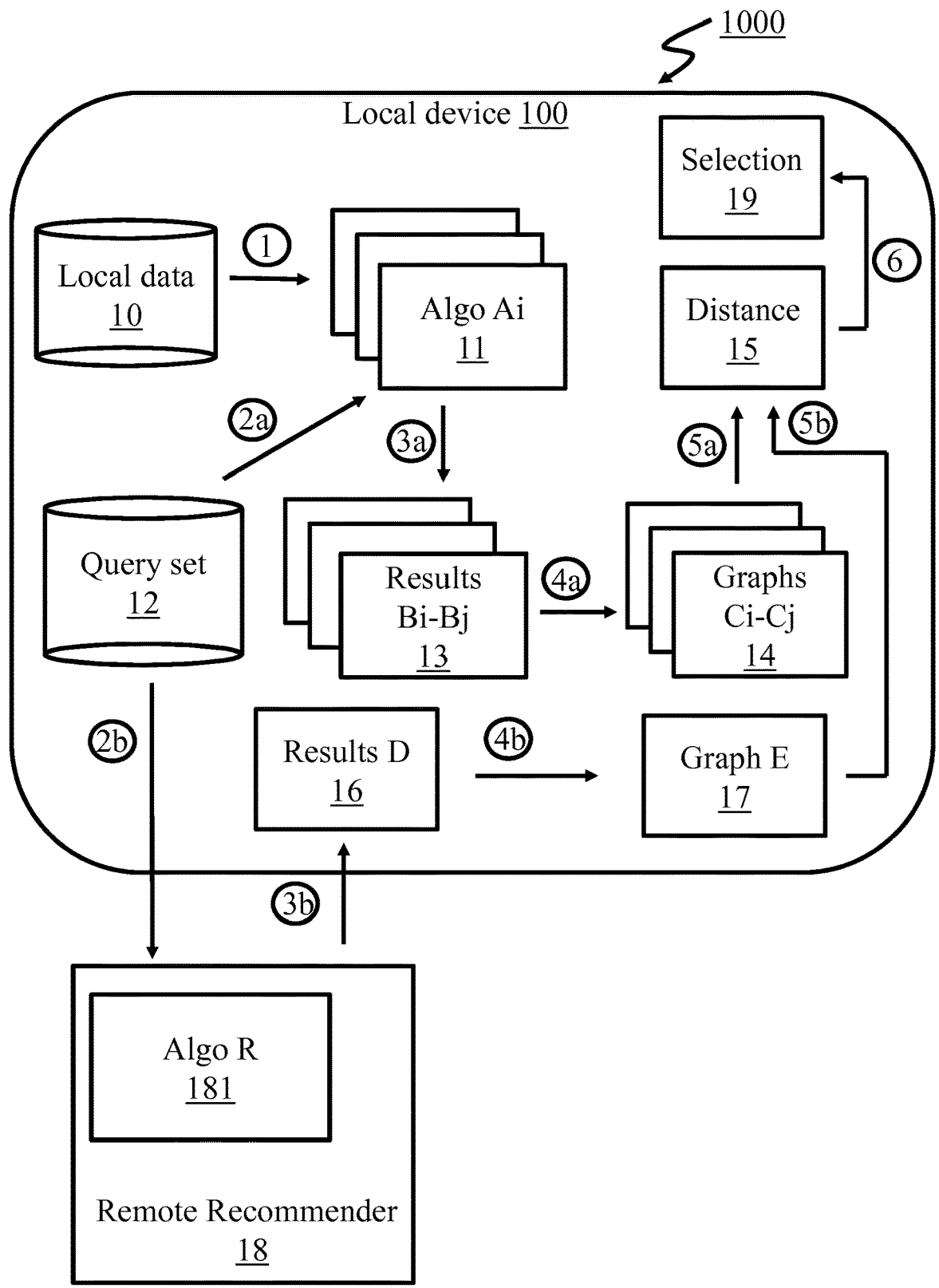
FIG. 1 is a block diagram of a system including an embodiment of a method of selection of a local recommendation algorithm (method) according to the present principles.

FIG. 1 is a block diagram of a system including an embodiment of a method for the selection of a local recommendation algorithm according to the present principles. The system 1000 includes a local device (e.g., a mobile communications device) 100 and a remote recommendation system 18. Remote recommendation system 18 includes a recommendation algorithm R 181. Remote recommendation system 18 is for example a well-established recommendation system with a private database of significant size. Therefore, the query results (output of the remote recommendation system 18) can be used as a reference for comparing and selecting a local recommendation algorithm.

A set of local candidate recommendation algorithms Ai-Aj 11 are trained on the data 10 that is locally available, arrow 1. Note that training does not require human intervention, as it uses the actions of the device owner as the labelled ground truth, which is sufficient for operation. Those candidate local recommendation algorithms Ai-Aj 11 are thus ready to produce recommendations. A query-set 12 is derived based on the local data 10, as the plurality of the recommendation queries (requests). The query-set is used, arrow 2a, to query the local recommendation algorithms Ai-Aj 11: Ai-Aj 11 produce (arrow 3a) results Bi-Bj 13 from the queries (recommendations) from the query-set. The same queries from the query-set 12 are also used, arrow 2b, to query the remote recommendation system 18. This produces, arrow 3b, query results D 16. Each of the query results Bi-Bj 13 and D 16, are used as inputs, arrow 4a respectively 4b, into a graph formatting function, which creates graphs Ci-Cj 14 respectively and a reference graph E 17. There is no need for visualization of the graphs, as their data structure is used. The data structure of the graphs Ci-Cj 14 respectively 17 are input, arrow 5a respectively 5b, into a distance computing function 15. Distance computing function 15 computes, based on the graphs Ci-Cj 14 and reference graph E 17, a distance between each of the graphs Ci-Cj 14 and reference graph E 17. These distances are compared, arrow 6, by a selection function 19, which chooses the algorithm that generated a graph Ci-Cj 14 with the smallest distance (among the local candidate recommendation algorithms Ai-Aj 11) to the reference graph E 17. The selected local candidate recommendation algorithm then becomes the recommendation algorithm to employ for local recommendations on the device 100. The local recommendation algorithms are for example based on Singular Value Decomposition techniques (SVD), k-nearest neighbors techniques (KNN), or deep neural networks. An example query-set includes queries that result in a list of recommended movies and ratings for these movies. For example, a query set is composed of a set of user profiles, which can be empty profiles created manually or automatically, and a list of movie ratings or consumptions for each user. For example, a query set can be composed of two different users, the first one consuming movie A then movie B, and the second one consuming movie A and then movie C.

According to a particular embodiment, the candidate local recommendation algorithms Ai-Aj 11 include differently parametrized but same recommendation algorithms. According to a further embodiment, the candidate local recommendation algorithms Ai-Aj 11 are different algorithms.

According to a particular embodiment, local device 100 is a mobile device such as a tablet, smart phone or portable PC. According to a further embodiment, the local device 100 is a Set Top Box or a gateway.

Figure 2A:
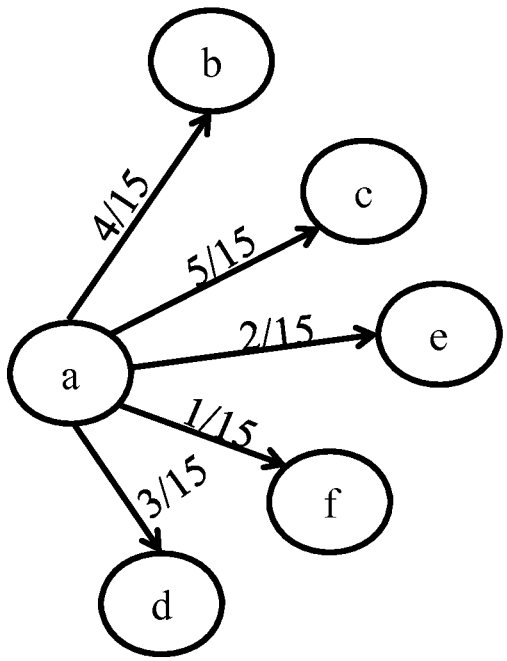
FIGS. 2a-2b show graph generation from recommendation results.
Figure 2B:
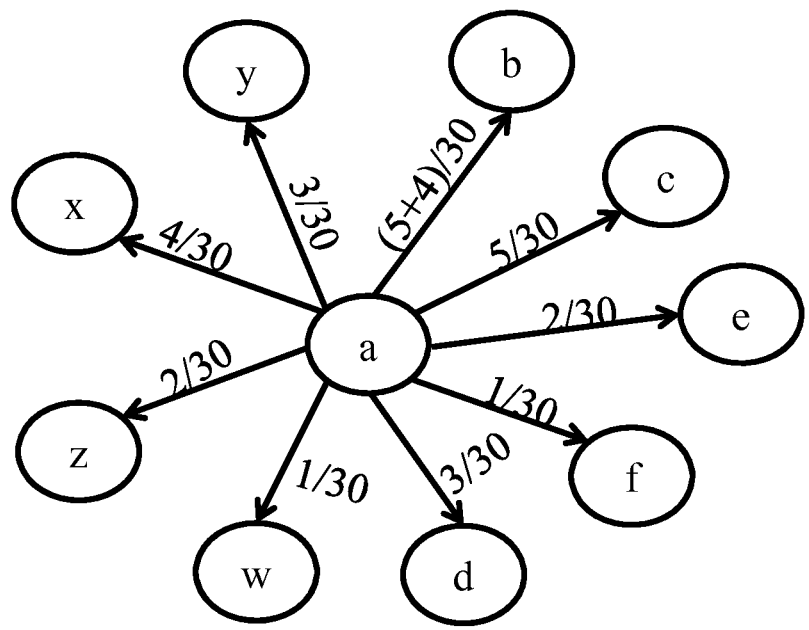

FIGS. 2a-2b show graph generation from recommendation results. A recommendation result is typically a list of items (e.g., a list of movies) based on recommendation queries (e.g., query-set 12) over input data (e.g., local data 10); (e.g., movie ratings generated by a user) done by a recommendation algorithm. It is assumed here that the reader is familiar with the graph description using edges, weights and vertices. By way of example, the graph construction adheres to the following rules, where a vertex in such a graph is for instance a movie, and an edge is the relation between two movies (for instance being recommended frequently together):

1. Vertex i is present in the graph if and only if there exists a recommendation for item i and/or a user feedback event for item i (e.g., a movie rating).
2. Edge $e_{ij}$ is present if and only if item j is at least in one recommendation list triggered by a feedback event for item i.
3.

$$\text{Edge } e_i \text{ weight} = \frac{\Sigma_{e_i} \text{ ranking\_score}}{\Sigma_{e \in E} \Sigma_e \text{ ranking\_score}}$$

FIG. 2a represents an example graph created after a first recommendation event. As a first recommendation event, a first user rated movie 'a'. The recommendation algorithm returns recommendation results [c, b, d, e, f] as a function of the user profile and other features internal to the recommendation algorithm used such as ratings for other movies done by users with a similar profile, with a highest to lowest score (rank) of 5, 4, 3, 2, respectively 1, i.e., 5 for movie c, 4 for movie b, etc. Edges a, b, c, d, e, f are created with vertices originating from a. As the total of the scores (ranks) is 5+4+3+2+1=15, edge weight is 5/15 for c, 4/15 for b, 3/15 for d, 2/15 for e, and 1/15 for f. FIG. 2b represents an evolution of the graph from FIG. 2a after a second recommendation event, i.e. a second rating of the same movie 'a' received from a second, different user. The recommendation algorithm returns recommendation results [b, x, y, z, w] for this user. Therefore, new edges are created from a, notably x, y, z, and w. Edge b exists already. As the total of the scores (ranks) is now 30, edge weight is 4/30 for x, 3/30 for y, 2/30 for z and 1/30 for w, and the weights of c, d, e, f are now adjusted to 5/30, 3/30, 2/30 and 1/30 respectively. As movie b was also ranked by the second recommendation algorithm and received a rank 5, the weight of b is thus adjusted to (4+5)/30. While FIGS. 2a and 2b show graphical representations of a recommendation graph for explanative purposes, the graphs are stored in a data structure for the purpose of subsequently computing (calculating) a distance between graphs created from a same query-set by different recommendation algorithms.

Subsequently to (after) the graph generation, a distance is calculated between (the data structure of) two graphs, e.g., between each of Ci-Cj 14 and E 17 as follows. For each graph Ci-Cj 14, the method extracts a set of features that consist of at least one value (e.g., the number of vertices in the graph, number of edges in the graph, vertex in-degree distribution, page rank, betweenness centrality, Eigenvector centrality, closeness centrality, assortativity, shorted distances). This extracted set of features is stored in a feature vector, one vector per graph Ci-Cj 14 and E 17. The distance computed by distance computing function 15 is then a standard L2 (i.e., norm 2) distance between two vectors. The local recommendation algorithm Bi-Bj corresponding to graph Ci-Cj 14 with the smallest distance is then the one that is selected for use by the local recommendation system.

According to a particular embodiment, a Graph Edit Distance is used. Graph edit distance starts from a (data structure of) graph Ci-Cj 14 and counts for each graph Ci-Cj 14 the number of vertex and/or edge insertions, deletions and substitutions to arrive at a same graph as graph E 17, in other words: the number of vertex and/or edge insertions required to create graph E 17 from graph Ci-Cj 14. The number of operations (insertions, deletions and substitutions) to do so is the calculated distance between the graph Ci-Cj 14 and graph E 17. The graph Ci-Cj 14 requiring the minimum of the number of vertex and/or edge insertions, deletions and substitutions to arrive at a same graph as graph E 17 is then the graph having the smallest distance to graph E 17. The local recommendation algorithm Ai-Aj 11 corresponding to graph Ci-Cj 14 with the smallest distance is then the one that is selected for being used by a local recommendation system.

According to a different embodiment, graph distance relies on graph kernels, for example random walk kernel, which performs random walks on two graphs simultaneously, and counts the number of paths that were produced by both walks. The resulting count is the distance between the two graphs.

According to a different embodiment, there is no graph generation and distance comparing between graphs, but instead distance is compared between ranked lists of top returned recommendations for each query in the query set. This is for instance the goal of the so-called Kendall taumetric, that counts the number of pairwise disagreements between two ranked lists. This method returns less precise results but has the merits to be computationally less complex.

Figure 3:
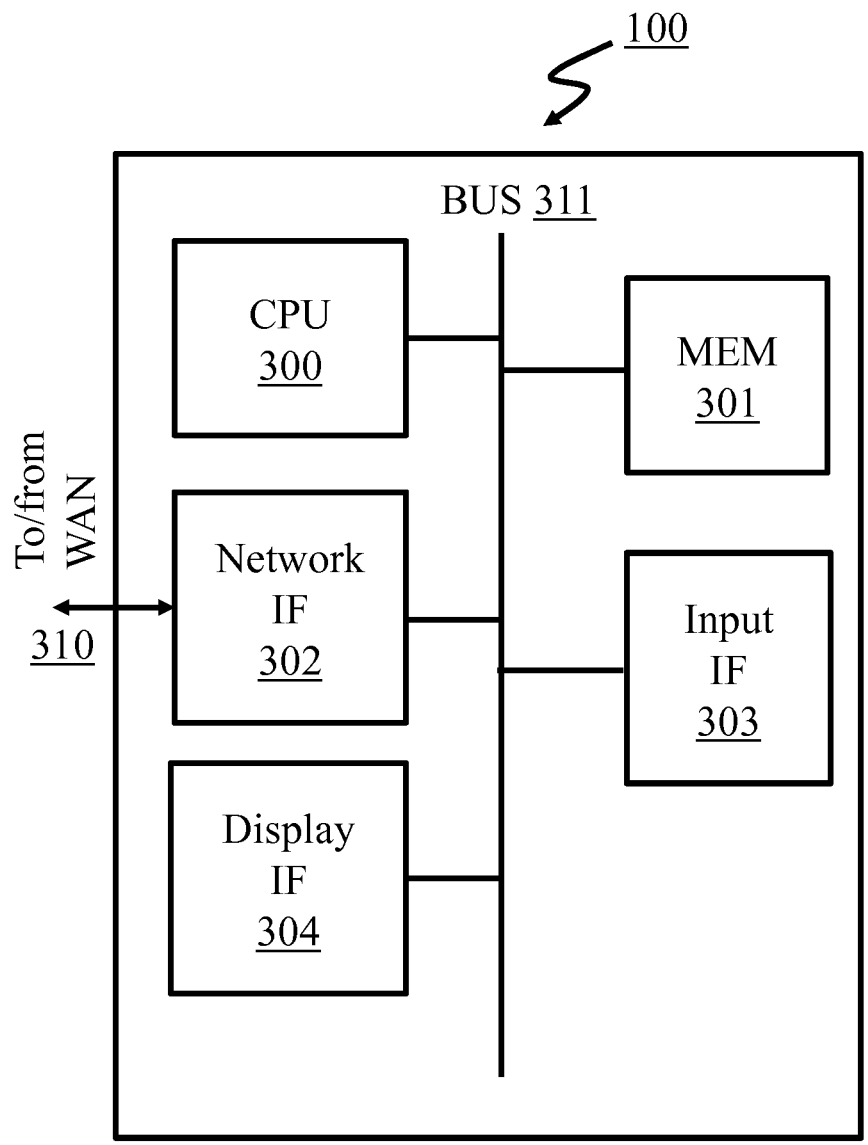
FIG. 3 is an embodiment of a device suitable for implementing the method per the principles of the present disclosure.

FIG. 3 is an embodiment of a device suitable for implementing the method per the principles of the present disclosure. The device 100 includes a processor or central processing unit 300, a memory 301, a network interface 302 (e.g., a wireless communication interface) for connection to a WAN via a connection 310, an input interface 303 (e.g. a keyboard or tactile display), and a display interface 304 (e.g. a tactile display or a non-tactile display). The elements 300-304 are interconnected via an internal data communication bus 311. Memory 301 is configured to store machine readable instructions which are executable for processor 300. Memory 301 is for example configured to store local recommendation algorithms Ai-Aj 11. Memory 301 is further configured to store data such as the previously discussed query-set 12, and the previously discussed plurality of local recommendation results Bi-Bj 13. Memory 301 is further configured to store previously discussed remote recommendation result D 16, as well as distances between each of the plurality of local recommendation results Bi-Bj 13 and remote recommendation result D 16. Processor 300 is configured to query each of local recommendation algorithms Ai-Aj 11 with the query-set 12 to obtain a plurality of local recommendation results Bi-Bj 13 and store these in memory 301. Processor 300 in combination with network interface 302 is further configured to query remote recommendation system 18 with query-set 12 to obtain the previously discussed remote recommendation result D 16 and to store it in memory 301. Processor 300 is further configured to compute a distance between each of the plurality of local recommendation results Bi-Bj 13 and remote recommendation result D 16 and to store the computed distances in memory 301. Processor 300 is further configured to select from the plurality of local recommendation algorithms Ai-Aj 11 stored in memory 301 the recommendation algorithm Ai-Aj 11 from which a recommendation result Bi-Bj 13 is obtained with a smallest distance to the remote recommendation result D 16 stored in memory 301.

Figure 4:
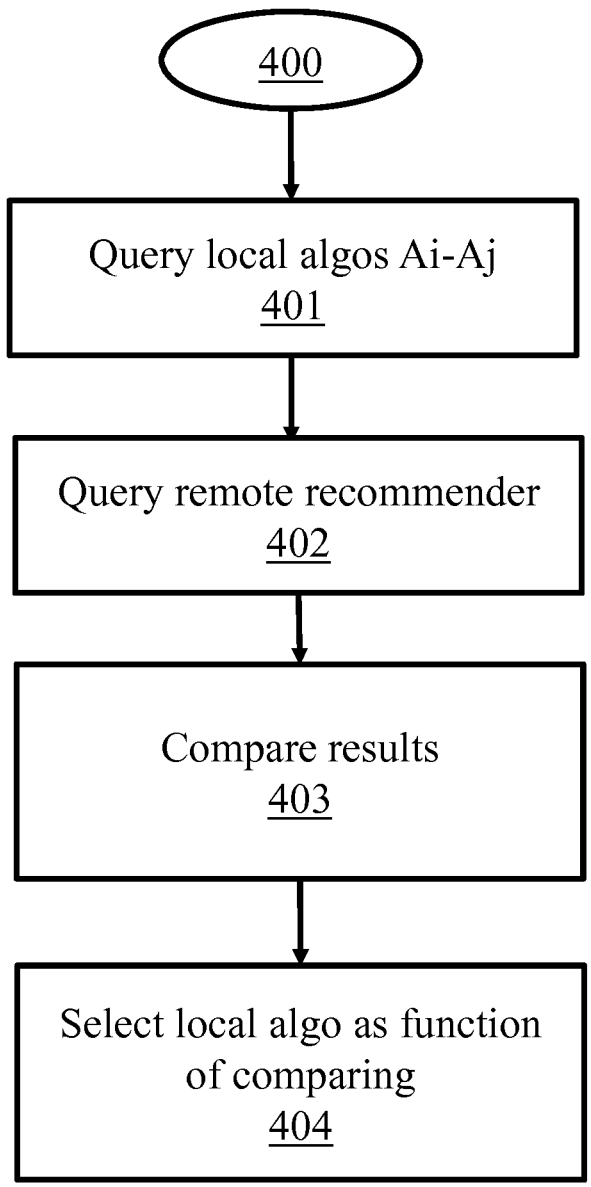
FIG. 4 is a flow chart related to the first embodiment of the method of selection of a recommendation algorithm per the principles of the present disclosure.

FIG. 4 is a flow chart 400 related to an embodiment of the method of selection of a recommendation algorithm per the principles of the present disclosure. The method is for example implemented by device 100. In a first step 401, each of a plurality of local recommendation algorithms Ai-Aj 11 is queried with a query-set 12 and a plurality of local recommendation results Bi-Bj 13 is obtained. In a step 402, a remote recommendation system 18 is queried with the query-set 12 to obtain a remote recommendation result D 16. In a step 403, a distance is computed between the plurality of local recommendation results Bi-Bj 13 and remote recommendation result D 16, i.e., the recommendation results Bi-Bj 13 and the remote recommendation result D 16 are compared. Finally, in step 404, one of the plurality of local recommendation algorithms Ai-Aj 11 is selected, namely one of the local recommendation algorithms Ai-Aj 11 from which a recommendation result Bi-Bj 13 is obtained with a smallest distance to the remote recommendation result D 16, i.e., as a function of the comparing. Note that while FIG. 4 illustrates the general principles of the method, some of the steps of the method may be executed in a different order or in parallel. For example, steps 401 and 402 may be executed in an order 402-401 or in parallel.

According to an embodiment, the selected local algorithm is used to provide a recommendation to a user when the device is in off-line mode, e.g., when it cannot communicate with a server running a remote recommendation algorithm (e.g., it has no WAN connection), be it the remote recommendation algorithm which was used to select the local algorithm, or another remote recommendation algorithm.

According to an embodiment, the algorithm among the selected local recommendation algorithm and the remote recommendation algorithm used to provide a recommendation is chosen by the user of the device. A user may, for example, for certain recommendations, prefer not to communicate data to a remote server, and may therefore prefer to use the selected local algorithm.

It is to be appreciated that some elements in the drawings may not be used or be necessary in all embodiments. Some operations may be executed in parallel. Embodiments other than those illustrated and/or described are possible. For example, a device implementing the present principles may include a mix of hard- and software.

It is to be appreciated that aspects of the principles of the present disclosure can be embodied as a system, method or computer readable medium. Accordingly, aspects of the principles of the present disclosure can take the form of an entirely hardware embodiment, an entirely software embodiment (including firmware, resident software, micro-code and so forth), or an embodiment combining hardware and software aspects that can all generally be defined to herein as a "circuit", "module" or "system". Furthermore, aspects of the principles of the present disclosure can take the form of a computer readable storage medium. Any combination of one or more computer readable storage medium(s) can be utilized.

Thus, for example, it is to be appreciated that the diagrams presented herein represent conceptual views of illustrative system components and/or circuitry embodying the principles of the present disclosure. Similarly, it is to be appreciated that any flow charts, flow diagrams, state transition diagrams, pseudo code, and the like represent various processes which may be substantially represented in computer readable storage media and so executed by a computer or processor, whether such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. Some or all aspects of the storage medium may be remotely located (e.g., in the 'cloud'). It is to be appreciated that the following, while providing more specific examples of computer readable storage mediums to which the present principles can be applied, is merely an illustrative and not exhaustive listing, as is readily appreciated by one of ordinary skill in the art: a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

The invention claimed is:

1. A method of selection of a recommendation algorithm for a local recommender in a device, said method comprising:
   querying a plurality of local recommendation algorithms local to the device with a query-set and obtain a plurality of local recommendation results for the query-set;
   querying a remote recommendation system remote to the device with said query-set to obtain a remote recommendation system result for the query-set;
   inputting each of the plurality of local recommendation results for the query-set into a graph formatting function to create a plurality of graphs, wherein each of the plurality of graphs corresponds to a respective one of the plurality of local recommendation results for the query-set;
   inputting the remote recommendation system result for the query-set into the graph formatting function to create a reference graph;
   computing a distance between each of the plurality of graphs that corresponds to the plurality of local recommendation results for the query-set and the reference graph to obtain a plurality of distances; and
   comparing the plurality of distances and selecting a local recommendation algorithm among the plurality of local recommendation algorithms local to the device that generated a graph with the smallest distance to the reference graph to use for a local recommender in the device.

2. The method according to claim 1, wherein said plurality of local recommendation algorithms comprise at least two differently parametrized versions of a same algorithm.

3. The method according to claim 1, wherein the method is implemented by one among a mobile communication device, a gateway, a set top box.

4. The method according to claim 1, wherein a recommendation is based on said selected local recommendation algorithm in an off-line mode of said device and a recommendation is obtained from a remote recommendation algorithm in an on-line mode of said device.

5. The method according to claim 4, wherein said on-line mode corresponds to conditions allowing communication between said device and a remote server running said remote recommendation algorithm.

6. The method according to claim 1, wherein a recommendation is obtained from said selected local recommendation algorithm or from a remote recommendation algorithm based on user choice.

7. A device for selection of a recommendation algorithm for a local recommender in the device, the device comprising at least one processor, a memory and a network interface, said at least one processor being configured to:
query a plurality of local recommendation algorithms local to the device with a query-set and to obtain a plurality of local recommendation results for the query-set;
query a remote recommendation system remote to the device with said query-set to obtain a remote recommendation system result for the query-set;
input each of the plurality of local recommendation results for the query-set into a graph formatting function to create a plurality of graphs, wherein each of the plurality of graphs corresponds to a respective one of the plurality of local recommendation results for the query-set;
input the remote recommendation system result for the query-set into the graph formatting function to create a reference graph;
compute a distance between each of the plurality of graphs that corresponds to the plurality of local recommendation results for the query-set and the reference graph to obtain a plurality of distances; and
compare the plurality of distances and select a local recommendation algorithm among the plurality of local recommendation algorithms local to the device that generated a graph with the smallest distance to the reference graph to use for a local recommender in the device.

8. The device according to claim 7, wherein said device is one of a mobile communication device, a gateway, a set top box.

9. A non-transitory computer readable medium comprising program code instructions that when executed by a processor for implementing the steps of a method comprising:
querying a plurality of local recommendation algorithms local to a device with a query-set and obtain a plurality of local recommendation results for the query-set;
querying a remote recommendation system remote to the device with said query-set to obtain a remote recommendation system result for the query-set;
inputting each of the plurality of local recommendation results for the query-set into a graph formatting function to create a plurality of graphs, wherein each of the plurality of graphs corresponds to a respective one of the plurality of local recommendation results for the query-set;
inputting the remote recommendation system result for the query-set into the graph formatting function to create a reference graph;
computing a distance between each of the plurality of graphs that corresponds to the plurality of local recommendation results for the query-set and the reference graph to obtain a plurality of distances; and
comparing the plurality of distances and selecting a local recommendation algorithm among the plurality of local recommendation algorithms local to the device that generated a graph with the smallest distance to the reference graph to use for a local recommender in the device.

10. The non-transitory computer readable medium of claim 9, wherein said plurality of local recommendation algorithms comprise at least two differently parametrized versions of a same algorithm.

11. The non-transitory computer readable medium of claim 9, wherein a recommendation is based on said selected local recommendation algorithm in an off-line mode of said device and a recommendation is obtained from a remote recommendation algorithm in an on-line mode of said device.

12. The non-transitory computer readable medium of claim 11, wherein said on-line mode corresponds to conditions allowing communication between said device and a remote server running said remote recommendation algorithm.

13. The non-transitory computer readable medium of claim 9, wherein a recommendation is obtained from said selected local recommendation algorithm or from a remote recommendation algorithm based on user choice.

* * * * *